(12) United States Patent
Saito et al.

(10) Patent No.: US 10,154,521 B2
(45) Date of Patent: Dec. 11, 2018

(54) MOBILE DEVICE AND METHOD FOR ESTABLISHING A WIRELESS LINK

(71) Applicant: Sony Corporation, Tokyo (JP)

(72) Inventors: Shin Saito, Tokyo (JP); Stefan Koch, Oppenweiler (DE); Ralf Boehnke, Esslingen (DE)

(73) Assignee: Sony Corporation, Tokyo (JP)

( * ) Notice: Subject to any disclaimer, the term of this patent is extended or adjusted under 35 U.S.C. 154(b) by 3 days.

(21) Appl. No.: 14/648,996

(22) PCT Filed: Dec. 18, 2013

(86) PCT No.: PCT/EP2013/077074
§ 371 (c)(1),
(2) Date: Jun. 2, 2015

(87) PCT Pub. No.: WO2014/108284
PCT Pub. Date: Jul. 17, 2014

(65) Prior Publication Data
US 2016/0021692 A1    Jan. 21, 2016

(30) Foreign Application Priority Data
Jan. 9, 2013    (EP) .................................... 13150687

(51) Int. Cl.
*H04W 64/00*    (2009.01)
*H04W 76/02*    (2009.01)
(Continued)

(52) U.S. Cl.
CPC ............ *H04W 76/023* (2013.01); *G06T 7/11* (2017.01); *G06T 7/73* (2017.01); *H04M 1/7253* (2013.01);
(Continued)

(58) Field of Classification Search
None
See application file for complete search history.

(56) References Cited

U.S. PATENT DOCUMENTS 7,884,734 B2    2/2011    Izadi et al.
7,969,468 B2    6/2011    Hashimoto
(Continued)

FOREIGN PATENT DOCUMENTS

CN    102238761 A    11/2011
CN    102667812 B    4/2015
(Continued)

OTHER PUBLICATIONS

International Search Report dated Mar. 19, 2014 in PCT/EP2013/077074.
(Continued)

*Primary Examiner* — Ayanah S George
(74) *Attorney, Agent, or Firm* — Xsensus LLP (57) ABSTRACT

A mobile device that enables a user friendly selection of a target wireless enabled device, a wireless enabled device being configured to establish a wireless link with other devices, includes an imaging unit that acquires images of the surrounding of the mobile device and a display that displays images acquired by the imaging unit. An object detection unit is provided to detect wireless enabled devices within images acquired by the imaging unit, the wireless enabled devices being configured to establish a wireless link with other devices. Further, a user interface and a wireless interface are provided to establish a wireless link to a selected wireless enabled device. The display is configured to indicate detected wireless enabled devices in images displayed on the display and the user inter-face is configured to enable a user to select a wireless enabled device indicated on the display.

20 Claims, 6 Drawing Sheets

(51) Int. Cl.
*H04M 1/725* (2006.01)
*H04N 7/18* (2006.01)
*H04W 8/00* (2009.01)
*G06T 7/73* (2017.01)
*G06T 7/11* (2017.01)
*H04W 4/80* (2018.01)
*H04W 76/14* (2018.01)

(52) U.S. Cl.
CPC ... *H04M 1/72519* (2013.01); *H04M 1/72533* (2013.01); *H04N 7/183* (2013.01); *H04W 4/80* (2018.02); *H04W 8/005* (2013.01); *H04W 76/14* (2018.02); *G06T 2200/24* (2013.01); *H04M 2250/52* (2013.01)

(56) References Cited

U.S. PATENT DOCUMENTS

| | | | |
|---|---|---|---|
| 2002/0175921 A1* | 11/2002 | Xu | G06K 9/34 345/589 |
| 2004/0048571 A1* | 3/2004 | Kiyose | G01C 21/16 455/41.2 |
| 2005/0114373 A1* | 5/2005 | Kulp | G06F 3/0481 |
| 2005/0114374 A1* | 5/2005 | Juszkiewicz | G11B 19/025 |
| 2007/0217650 A1 | 9/2007 | Ota et al. | |
| 2008/0095533 A1* | 4/2008 | Lee | H04B 10/1143 398/38 |
| 2009/0185763 A1 | 7/2009 | Park et al. | |
| 2009/0262716 A1* | 10/2009 | Kawakami | H04W 48/20 370/338 |
| 2010/0311347 A1* | 12/2010 | Le Thierry D'Ennequin | H04N 1/32106 455/67.11 |
| 2010/0317332 A1 | 12/2010 | Bathiche et al. | |
| 2011/0037712 A1 | 2/2011 | Kim et al. | |
| 2011/0052072 A1 | 3/2011 | Lee | |
| 2011/0072263 A1* | 3/2011 | Bishop | G06F 21/36 713/168 |
| 2011/0275317 A1* | 11/2011 | Ryu | H04M 1/274516 455/41.1 |
| 2012/0046100 A1* | 2/2012 | Roman | F41G 1/467 463/30 |
| 2012/0147041 A1 | 6/2012 | Jang | |

FOREIGN PATENT DOCUMENTS

| | | |
|---|---|---|
| EP | 2 293 531 A1 | 3/2011 |
| EP | 2 466 968 A1 | 6/2012 |
| EP | 2 611 125 A1 | 7/2013 |
| JP | 11-345339 | 12/1999 |
| JP | 2007-258831 | 10/2007 |
| JP | 2008-85393 | 4/2008 |
| JP | 2010-218009 | 9/2010 |
| JP | 2012-235440 | 11/2012 |
| JP | 2012-529866 | 11/2012 |
| WO | WO 2013/154476 A1 | 10/2013 |
| WO | WO 2013154476 A1 * | 10/2013 ......... H04M 1/7253 |
| WO | WO-2013154476 A1 * | 10/2013 ......... H04M 1/7253 |

OTHER PUBLICATIONS

Combined Chinese Office Action and Search Report dated Jun. 19, 2017 in Patent Application No. 201380069965.X (with English Translation of Category of Cited Documents).
Japanese Office Action dated Sep. 19, 2017 in Patent Application No. 2015-551155 with English Translation. (14 pages).

* cited by examiner

MOBILE DEVICE AND METHOD FOR
ESTABLISHING A WIRELESS LINK

CROSS-REFERENCE TO RELATED
APPLICATIONS

The present application is based on PCT/EP2013/07704 filed Dec. 18, 2013, and claims priority to European Patent Application 13150687.5, filed in the European Patent Office on Jan. 9, 2013, the entire contents of each of which being incorporated herein by reference.

BACKGROUND

Field of the Disclosure

The present disclosure relates to a mobile device and to a method for establishing a wireless link between a mobile device and a wireless enabled device, a wireless enabled device being a device that is configured to establish a wireless link with other devices.

Description of Related Art

Wireless enabled devices, i.e. electric devices having a WiFi capability and being able to establish a wireless link to other devices to receive and/or transmit data or any kind of information, are nowadays in widespread use. Such wireless enabled devices include, but are not limited to, mobile phones, smart phones, tablet computers, PDAs, photo cameras, video cameras, portable music or video players, TV-sets, disc players, personal computers (PCs) or gaming devices. Examples for disc players are DVD players or Blu-ray players. Examples for personal computers (PCs) are desktop computers, notebook computers, netbooks or so-called ultra-books. Examples for gaming devices are video game consoles or handheld/portable game consoles. Some wireless enabled devices (including some of those mentioned before) can be used as mobile devices.

To establish a wireless link to another device, i.e. a target wireless enabled device, the user currently has to choose the target wireless enabled device from a device list shown on a screen of the user's actual wireless enabled device. Said device list generally established based on a device discovery protocol. For instance, when setting up wireless connection on a personal computer or a tablet computer, the operating system of such computer will generally ask the user to choose the desired target wireless enabled device from one or more wireless base station (e.g. a wireless hot spot, wireless access point, or the like) candidates. However, it has been found that such a user interface is not sufficiently comfortable and not sufficiently easy to use, i.e. it does not allow an intuitive user operation.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide a more user friendly mobile device and a mobile device and a method for establishing a wireless link between a mobile device and a wireless enabled device. It is a further object to provide a corresponding computer program and a non-transitory computer-readable recording medium for implementing said method.

According to an aspect there is provided a mobile device comprising
an imaging unit that acquires images of the surrounding of the mobile device,
a display that displays images acquired by the imaging unit,
an object detection unit that is configured to detect wireless enabled devices within images acquired by said imaging unit, said wireless enabled devices being configured to establish a wireless link with other devices, and
a wireless interface that is configured to establish a wireless link to a selected wireless enabled device, and
a user interface,
wherein said display is configured to indicate detected wireless enabled devices in images displayed on said display and said user interface is configured to enable a user to select a wireless enabled device indicated on said display.

According to a further aspect there is provided a mobile device and a method for establishing a wireless link between a mobile device and a wireless enabled device comprising
acquiring images of the surrounding of the mobile device,
displaying images acquired by the imaging unit,
detecting wireless enabled devices within images acquired by the mobile device,
indicating detected wireless enabled devices in images displayed by the mobile device enabling a user to select an indicated wireless device, and
establishing a wireless link to a selected wireless enabled device.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the claimed method, the claimed computer program and the claimed computer-readable recording medium have similar and/or identical preferred embodiments as the claimed device and as defined in the dependent claims.

One of the aspects of the disclosure is to provide that the user of the mobile device can choose the desired target wireless enabled device based on an optical view of the available wireless enabled devices on the display (screen) on its own mobile device. This enables that the user can choose the desired target wireless enabled device intuitively by use of an appropriate user interface so that the user can choose the desired wireless enabled device from the indications on the display of his mobile device. Thus, contrary to currently used device lists showing only brief indications (generally only a short name of the wireless enabled device assigned by the operator or owner of the wireless enabled device) of the wireless enabled devices that could be found by the device discovery protocol, the mobile device and method of the present disclosure provide further information about the found wireless enabled device, in particular at least an image and, according to preferred embodiments, the current location, the type of device or the wireless capability.

It is to be understood that both the foregoing general description of the invention and the following detailed description are exemplary, but are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
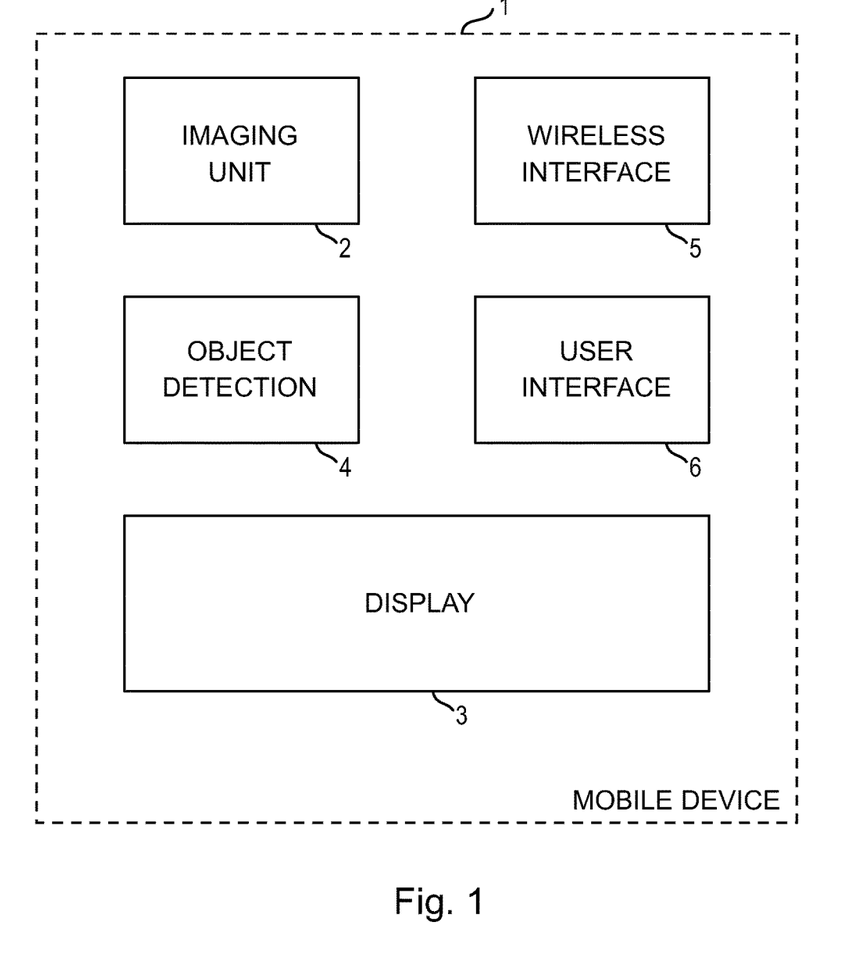
FIG. 1 shows a first embodiment of a mobile device according to the present invention.

Referring now to the drawings, wherein like reference numerals designate identical or corresponding parts throughout the several views, FIG. 1 schematically shows a first embodiment of a mobile device 1 according to the present invention. The mobile device 1 is configured to establish a wireless link with a wireless enabled device, which is generally a device that can establish a wireless link with other devices. The mobile device comprises an imaging unit 2 that acquires images of the surrounding of the mobile device 1 and a display 3 that displays images acquired by the imaging unit 2. An object detection unit 4 is provided to detect wireless enabled devices within images acquired by said imaging unit 2. Further, a user interface 5 and a wireless interface 6 are provided to establish a wireless link to a selected wireless enabled device. The display 3 is configured to indicate detected wireless enabled devices in images displayed on said display 3 and the user interface 5 is configured to enable a user to select a wireless enabled device indicated on said display 3.

In the following an example of a typical scenario of using a mobile device 1 according to the present disclosure shall be explained by referring to a smartphone as non-limiting example of the mobile device 1. When the user of the mobile device 1 turns on the imaging unit 2, which is an optical camera in this exemplary embodiment, the mobile device 1 searches wireless enabled devices in the surrounding which are ready for wireless connectivity, in particular with high data rate. In this search process an object detection algorithm is applied by the object detection unit, which is e.g. implemented as a processor, which detects wireless enabled devices within the surrounding. Detected wireless enabled devices are then identified on the display 3 showing the image acquired by the imaging unit 2, e.g. a live video of the surrounding seen by the optical camera.

Figure 2A:
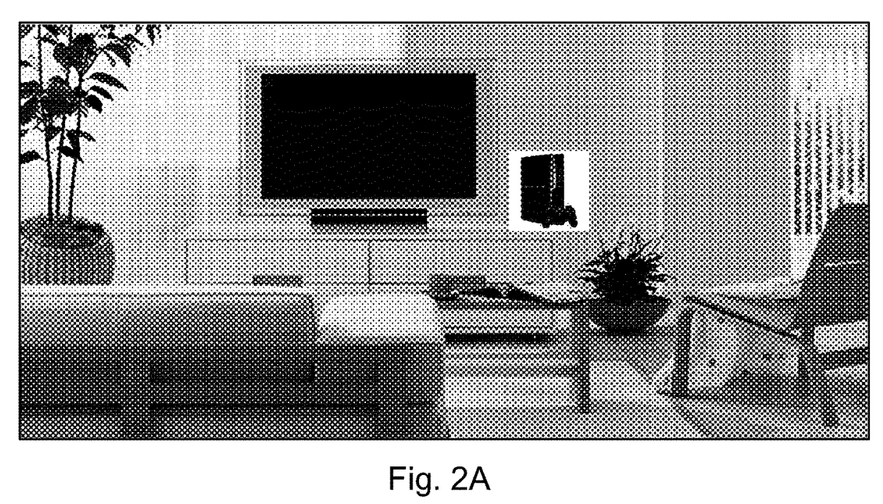
FIGS. 2A, 2B show a first example of the indication of detected wireless enabled devices.
Figure 2B:
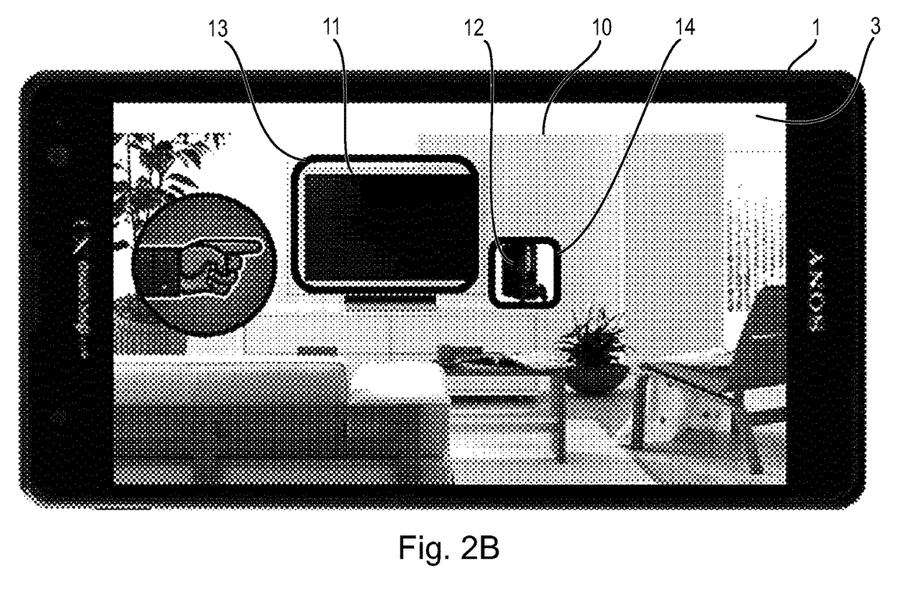

FIG. 2A shows the surrounding of the mobile device 1, which is a living room in this example. FIG. 2B shows the image 10 of the surrounding of the mobile device 1 as seen by the optical camera 2 and as displayed on the screen 3. In this embodiment only wireless enabled devices 11, 12 within the field of view of the optical camera 2 are detected. Preferably, an image recognition algorithm is applied for this detection within an image.

This detection preferably uses visible features of devices which are e.g. looked up in a database storing features of devices to identify the devices and to find out if a device has a wireless functionality. Preferably, additional parameters of a detected device, e.g. device type, storage space, parameters of the wireless functionality, etc. are detected, e.g. from the database, which additional parameters may also be indicated on the screen 4. Detected wireless enabled devices 11, 12, in this example a TV set 11 and a gaming device 12 (e.g. a playstation) are then indicated on the screen 4, e.g. by use of a frame 13, 14 (e.g. in red color to indicate "link ready") drawn around the respective wireless enabled device 11, 12 as shown in FIG. 2B.

In a preferred embodiment the mobile device 1 sends out probing signal to further improve the detection of wireless enabled devices. Thus, the objection detection unit not only uses image information in an image recognition algorithm, but also evaluates any response signals received from wireless enabled devices to detect and possibly identify wireless enabled devices.

This searching and object detection (and preferably object identification) process shall be repeated periodically to update the current real environment on the screen.

The mobile device 1 further comprises a user interface which is preferably realized by a touch screen 5 which is integrated into the display 3. Once the user has identified, among the detected and indicated wireless enabled devices, the target wireless enabled device with which a wireless link should be established, e.g. to receive the data from the mobile device 1, he taps the corresponding image 11 or 12 (here let 11 be the target wireless enabled device) of this target wireless enabled device on the screen 3, i.e. makes use of the touch screen 5, to select this target wireless enable device. Once he taps the image, the link should be established and a desired task should be carried out automatically, e.g. data should be transferred to this target wireless enabled device automatically.

Figure 3A:
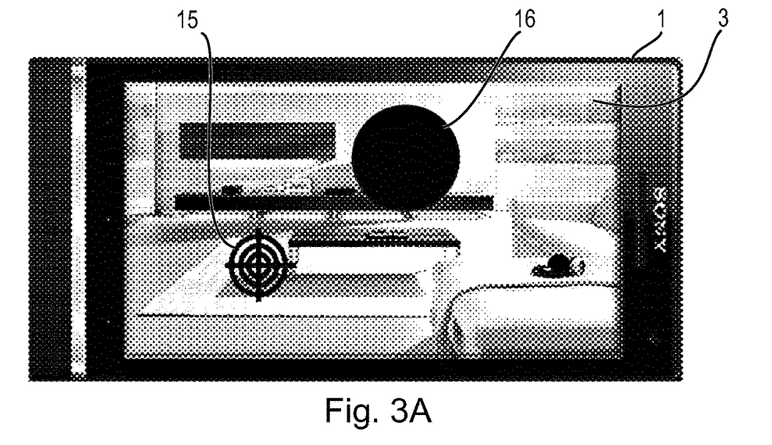
FIGS. 3A, 3B show a second example of the indication of detected wireless enabled devices.
Figure 3B:
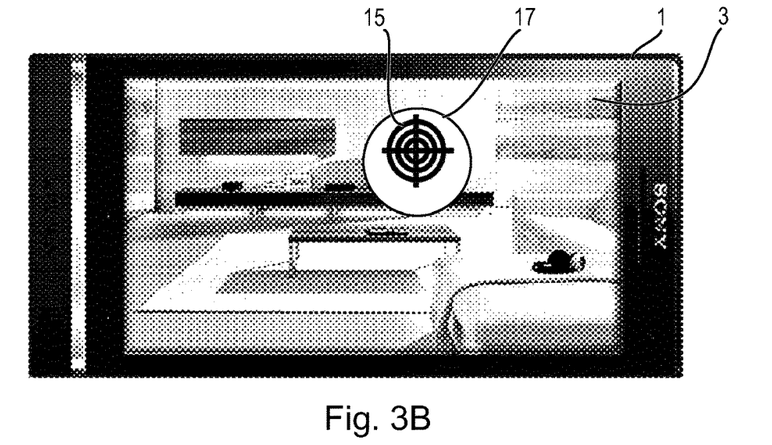

Until the task is carried out properly, warning information (such as 'stay/hold for a while') is preferably displayed on the screen 3. During the performance of the task, e.g. a data transmission, the "holding" of the mobile device is preferably supported in another embodiment by a corresponding "holding indicator", e.g. a "cross-hair" on the screen 3, as shown in FIGS. 3A, 3B. This holding indicator is tracking the movement of the mobile device (e.g. by a gyroscope) and indicates whether the mobile device 1 is held incorrectly (FIG. 3A) or correctly (FIG. 3B). If the mobile device 1 is held incorrectly the holding indicator 15 ("cross-hair) is shown at a different position than the target wireless enabled device 11, which may additionally be indicated by another symbol 16, e.g. a red dot at the position of the target wireless enabled device. If the mobile device 1 is held correctly the holding indicator 15 ("cross-hair) is shown at the position of the target wireless enabled device, which may additionally be indicated by a symbol 17, e.g. a green dot at the position of the target wireless enabled device 11.

Once the task is correctly performed, e.g. the data is transferred properly, a corresponding "task finished indication" will be shown on the screen. For instance, an image of the target wireless enabled device 11 on the screen 3 will indicate 'Data transfer completed'. Examples of such a "task finished indication" include one or more of a blue circle, specific sounds, an icon/symbol/sign to inform the user that the link/connection between the devices is kept (maintained active) or that the connection between the devices is terminated (disconnected) In an embodiment it is possible to select the kind of indicator to be used as "task finished indication" and to store it as user preference setting. Then, the screen 3 of the mobile device 1 will return to its normal status (e.g. return from blue to red).

Thus, according to the present disclosure the screen image shown on the display 3 of the mobile device 1 shows users the usable/capable wireless enabled device(s) which can be seen by the optical camera 2 in contrast to known solutions according to which all usable/capable wireless enabled devices are just listed in a list even though users do not know where the wireless enabled devices are located and what kind of wireless enabled device is really indicated by a certain list entry (typically only short acronyms, short names or a MAC address is listed). The proposed solution thus provides a much more user friendly mobile device that enables a user to intuitively and easily select a desired wireless enabled device for establishing a wireless link, e.g. to transfer data to said selected wireless enabled device.

Figure 4:
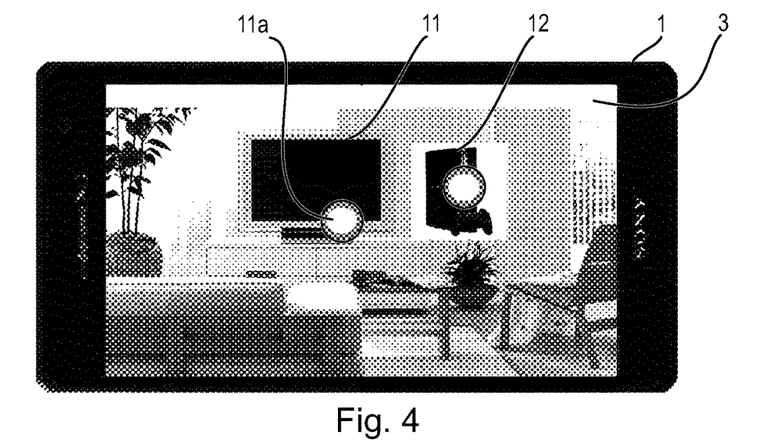
FIG. 4 shows an example of the transmission of an optical information signal from wireless enabled devices.

Another embodiment of a mobile device 1 according to the present disclosure is depicted in FIG. 4. Each wireless enabled device might send/issue a specific beacon signal (also called information signal) to help the mobile device to find itself and to obtain specific information (i.e. radio transmission features supported by the wireless enabled device, storage capability available at the wireless enabled device, etc.). This beacon signal (information signal) can be radiated i.e. by optical means (i.e. the (red) standby LED at a TV set or an IR diode) or by some alternative wireless radio technology at a predetermined (e.g. lower) frequency, for instance in the ISM bands below 1 GHz, near 2.4 GHz or in the 5 Ghz-6 GHz range. This is illustrated in FIG. 4 where an optical beacon is radiated via the standby LED 11a of the TV set 11 (and/or the standby LED 12a of the gaming device 12) in a manner which is invisible to the human eye (thus providing no flicker) but can be detected by the optical detection unit from the image information acquired by the imaging unit.

A radio is not easily coupled (synchronized) with the field of view of the optical camera 2 in the mobile device 1, therefore a radio beacon would simply broadcast the device features/capabilities and thereby assist the mobile device in finding a specific target wireless enabled device. For instance, if the radio broadcast message contains the information of the type/model of the wireless enabled device it can be found/identified easier by the object detection unit 4 by using not only the (visible) information from the acquired image(s) but in addition using broadcast information about the respective wireless enabled device(s). Furthermore, if the broadcast beacon already indicates that a certain device has no storage capability left for a data transfer desired by the user such information can be presented to the user immediately. In case multiple wireless enabled devices in a room are present the user might see a list of possible wireless enabled devices (and how they look like) and their status (i.e. capacity available). Then the user can much easier 'spot' to the most convenient wireless enabled devices for the data transfer (i.e. home server, TV set, laptop, . . . ).

As explained above the display 3 is preferably configured to display an image, i.e. generally a still image, acquired of the surrounding of the mobile device and to indicate wireless enabled devices detected within said image. Alternatively, the display 3 is configured to continuously display the currently acquired live video and to indicate wireless devices detected within the currently displayed live video. Accordingly, the imaging unit 2 is configured to acquire still images and/or live video images and comprises a still camera, a video camera, an image sensor or an image sensor module.

The object detection unit 4 is preferably configured to analyze an image, in particular to segment an image. Further, the object detection unit 4 is configured to identify devices in an analyzed image and to identify wireless enabled devices among the identified devices. For this analysis a segmentation using generally known image segmentation algorithms may be applied. The segmentation helps to identify device, in particular wireless enabled devices, within an image.

Preferably, a generally known image recognition algorithm is applied by the object detection unit 4 to detect wireless enabled devices within an image. The analysis of the image may further include, in preferred embodiments, feature extraction of features of object and/or pattern recognition.

In preferred embodiment the user interface 5 comprises a touch screen that is integrated in said display 3 and that is configured to enable a user to select an indicated wireless enabled device shown on said touch screen.

As shown in FIGS. 2A, 2B and 3A, 3B the display is preferably configured to indicate a detected wireless device by an indicator. Various kinds of indicators can be used for this purpose, such as a color indicator, a pointer, a frame around the detected wireless device, an icon, photo or drawing of the detected wireless enabled device, or cross hairs. The kind of indicator may be preset, but may preferably also be selectable and/or changeable by the user. Preferably, the indicator is configured to indicate if a detected wireless enabled device is ready for establishing a wireless link with said wireless interface.

Advantageously, the mobile device 1 is configured to check the availability and/or wireless link capability of a wireless link to a detected wireless enabled device before said display indicates a detected wireless enabled device by an indicator that is configured to indicate if a detected wireless enabled device is ready for establishing a wireless link with said wireless interface. In other words, the wireless link to the detected wireless enabled device(s) is tested before it is indicated to the user that the wireless link to a particular wireless enabled device is available. For this purpose an availability indicator that indicates if a detected wireless device is configured to perform a pre-selected task after establishing a wireless link with said wireless interface is preferably used. Further, in an embodiment said display is configured to display a completion indicator to indicate if a pre-selected task by use of a wireless link has been completed. Said different kinds of indicators may simply be text indications, self-explaining pictograms (e.g. using color indications), or mixtures of text and pictograms.

The wireless interface 6 is preferably configured to maintain a wireless link and/or to communicate over a wireless link with a selected wireless enabled device only as long as the selected wireless enabled device is shown in the currently acquired image. In other words, only when the user holds the mobile device such that the selected (target) wireless enabled device can be seen through the camera of the mobile device the wireless link is active, otherwise it is switched to inactive state or even completely terminated. This provides a high security that the wireless link is only maintained with the desired wireless enabled device and, in particular, that a desired task (e.g. data is transmitted) is only performed with said wireless enabled device and not with any (not visible) wireless enabled device. To help the user of the mobile device to hold the mobile device in the direction of a selected wireless enabled device the display is preferably configured to display a guidance signifier, e.g. an arrow pointing into the direction into which the mobile device shall be moved and/or tilted.

As explained above the wireless interface 6 is preferably configured to transmit probing signals and receive response signals from wireless enabled devices to identify said wireless enabled devices, the capabilities of devices including a wireless enabled device and/or one or more parameters of said wireless enabled devices. Further, in an embodiment the wireless interface 6 is configured to receive a beacon signal transmitted by a wireless device, said beacon signal including one or more parameters of a detected wireless enabled device.

Further, in an embodiment the object detection unit 4 is configured to detect an optical information signal transmitted by a light source, in particular an LED or an IR diode as explained above with reference to FIG. 4, or a predetermined display image displayed on a screen of a wireless enabled device. Said predetermined display image may, for instance, be a barcode displayed on the screen at a certain position and/or for a short time. Alternatively, an indicator (such as a barcode), representing another form of optical information signal, may be attached to the wireless enabled device so that it can be detected within an image displayed on the screen.

Preferably, the object detection unit is configured to use said beacon signal and/or said optical information signal in the detection of wireless enabled devices within images acquired by said imaging unit. Further, said beacon signal and/or said optical information signal allows not only an identification of the device but also enables the retrieval of device-specific information from one or more databases storing parameters of wireless enabled devices.

Figure 5:
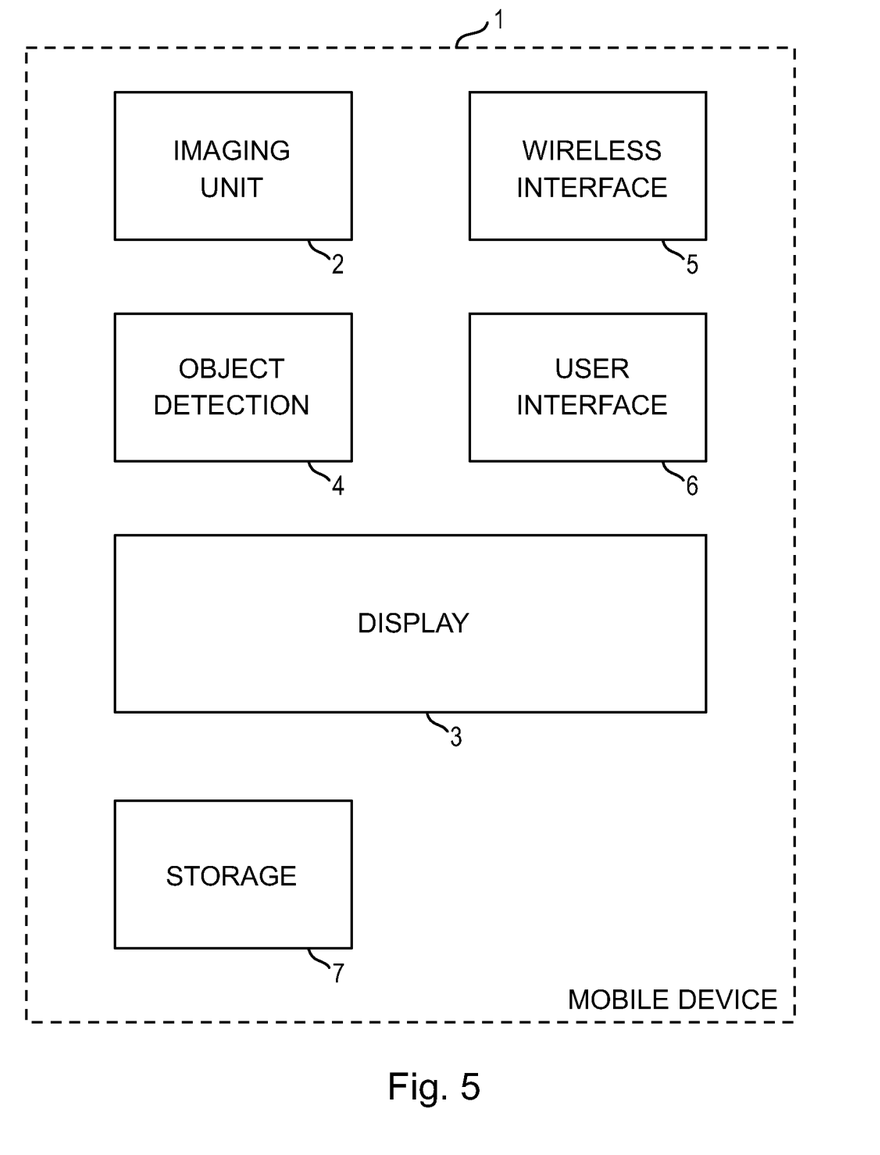
FIG. 5 shows a second embodiment of a mobile device according to the present invention.

Such a database is preferably stored on a website of the manufacturer or distributor of the device. Alternatively, the mobile device may comprise a storage unit 7, as shown in the embodiment of the mobile device 1*a* depicted in FIG. 5, said storage unit 7 storing one or more database storing parameters of wireless enabled devices.

One or more of the obtained parameters of a detected wireless enabled device may then also be displayed on the screen to further enable the selection of a desired wireless enabled device.

Access to an (externally stored) database may be achieved by use of the wireless interface 6 that is preferably configured to establish a wireless link to one or more databases storing parameters of wireless enabled devices. Alternatively, a communication interface 8 may be provided, as shown in the embodiment of the mobile device 1*b* depicted in FIG. 6, communication interface 8 being configured to establish a communication link to one or more databases storing parameters of wireless enabled devices.

Figure 6:
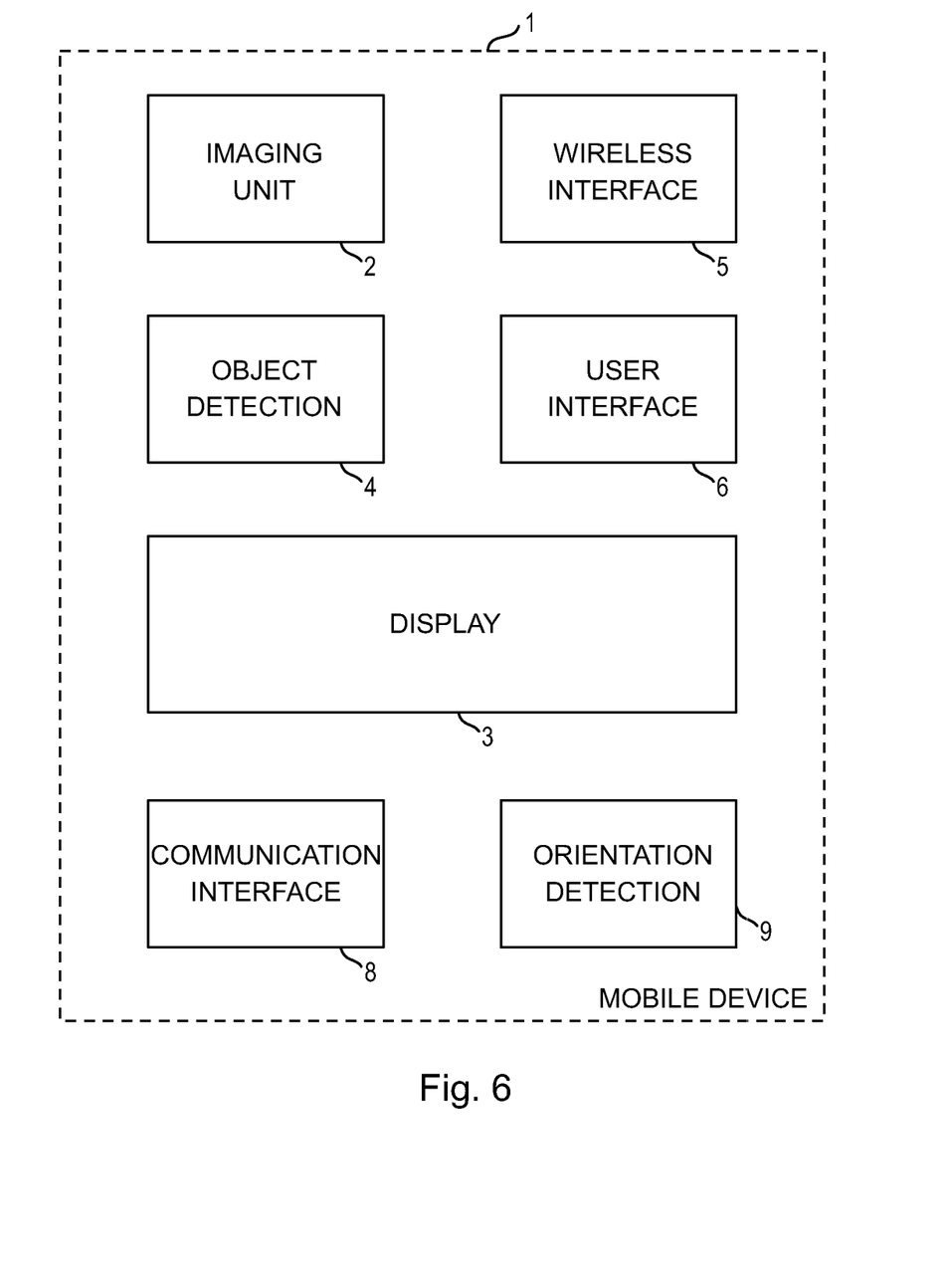
FIG. 6 shows a third embodiment of a mobile device according to the present invention.

Still further, in an embodiment, as also shown in FIG. 6, an orientation detection unit 9, such as a gyroscope, is provided that detects the orientation of the mobile device 1*b*. The information about the orientation of the mobile device 1*b* may be used to determine if the mobile device is held correctly, in particular points to the target wireless enabled device.

As explained above, one or more parameters of a wireless enabled device may be obtained from a database. Said one or more parameters preferably include one or more of the manufacturer, the device name, the device type, the wireless link capabilities, the storage type and capacity, the processing capacity, wireless link type and speed, connection time, and/or display features of a detected wireless enabled device. Said information is used to determine if a particular wireless enabled device is actually able to carry out a task that a user of the mobile device wants to carry out via a wireless link with the wireless enabled device.

Generally, the invention can be applied in any mobile device. Preferably, the mobile device is a handheld mobile device, such as a mobile phone, a smart phone, a tablet PC, a PDA, a photo camera, a video camera, a portable music or video player, a portable TV-set or a portable gaming device.

The proposed solution enables an easily usable, efficient and intuitive selection of a wireless enabled device for establishing a wireless link. In preferred embodiments the user is informed about the wireless connectivity capabilities as well as the exact position of the detected wireless enabled devices in the surrounding. Still further, in embodiments the safety (data privacy) can be increased since it is exactly known to the user to which wireless enabled device a wireless connection is established.

Figure 7:
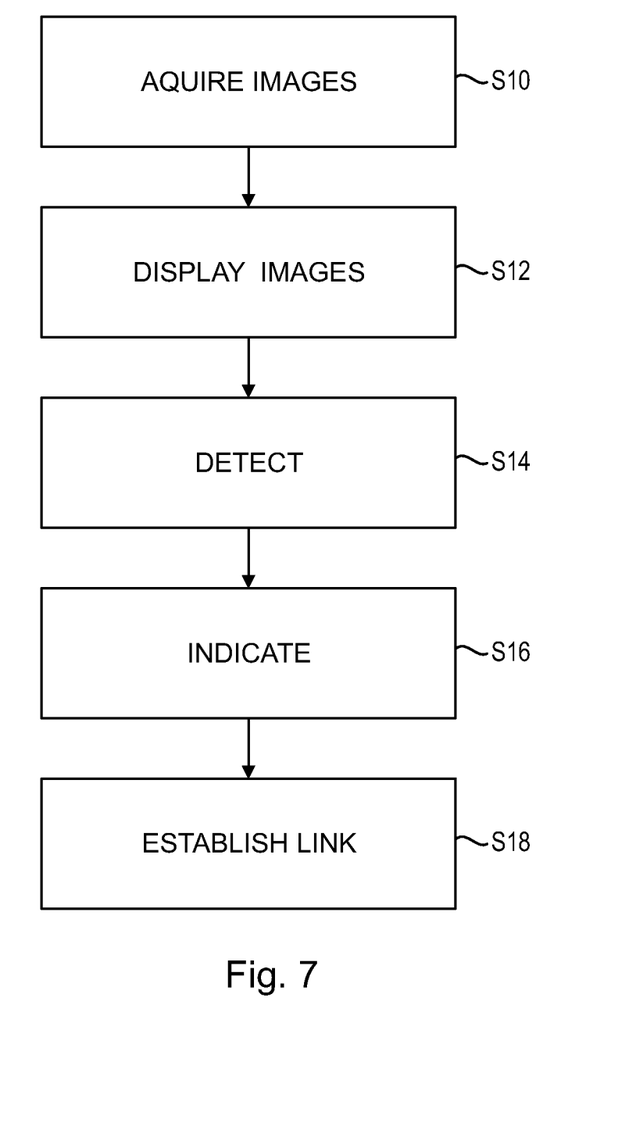
FIG. 7 shows a flow chart establishing a wireless link between a mobile device and a wireless enabled device according to the present invention.

A flow chart of the method for establishing a wireless link between a mobile device and a wireless enabled device according to the present disclosure is shown in FIG. 7. In a first step S10 images of the surrounding of the mobile device are acquired. In a second step S12 images acquired by the imaging unit are displayed. In a third step S14 wireless enabled devices within images acquired by the mobile device are detected. In a fourth step S16 detected wireless enabled devices in images displayed by the mobile device are indicated, enabling a user to select an indicated wireless device. In a fifth step S18 a wireless link to a selected wireless enabled device is established.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

Any reference signs in the claims should not be construed as limiting the scope.

The invention claimed is:

1. A mobile device comprising: a camera that acquires images of the surrounding of the mobile device, a display that displays images acquired by the camera, a processor configured to detect wireless enabled devices within images acquired by said camera by applying an image recognition algorithm to detect wireless enabled devices within said images acquired by said camera, said wireless enabled devices being configured to establish a wireless link with other devices, and a wireless interface that is configured to establish a wireless link to a selected wireless enabled device, and a user interface, wherein said display is configured to indicate detected wireless enabled devices in images displayed on said display by an indicator, said user interface is configured to enable a user to select a wireless enabled device indicated on said display and said processor is configured to control said wireless interface to maintain the wireless link in an active state to the selected wireless enabled device only when the selected wireless enabled device is shown in one of the currently acquired images.

2. The mobile device as claimed in claim 1, wherein said display is configured to display an image acquired of the surrounding of the mobile device and to indicate wireless enabled devices detected within said image.

3. The mobile device as claimed in claim 1, wherein said display is configured to continuously display currently acquired live video and to indicate wireless devices detected within the currently displayed live video.

4. The mobile device as claimed in claim 1, wherein said processor is configured to analyze an image, in particular by image segmentation, identify devices in an analyzed image and to identify wireless enabled devices among the identified devices.

5. The mobile device as claimed in claim 1, wherein said user interface comprises a touch screen that is integrated in said display and that is configured to enable a user to select an indicated wireless enabled device shown on said touch screen.

6. The mobile device as claimed in claim 1, wherein said camera is configured to acquire still images and/or live video images and comprises a still camera, a video camera, an image sensor or an image sensor module.

7. The mobile device as claimed in claim 1, wherein said display is configured to indicate a detected wireless enabled device by an indicator that is configured to indicate if a detected wireless enabled device is ready for establishing a wireless link with said wireless interface.

8. The mobile device as claimed in claim 1, wherein the mobile device is configured to check the availability and/or wireless link capability of a wireless link to a detected wireless enabled device before said display indicates a detected wireless enabled device by an indicator that is configured to indicate if a detected wireless enabled device is ready for establishing a wireless link with said wireless interface.

9. The mobile device as claimed in claim 1, wherein said display is configured to display an availability indicator to indicate if a detected wireless device is configured to perform a pre-selected task after establishing a wireless link with said wireless interface.

10. The mobile device as claimed in claim 1, wherein said display is configured to display a completion indicator to indicate if a pre-selected task by use of a wireless link has been completed.

11. The mobile device as claimed in claim 1, wherein said display is configured to display a guidance signifier that is configured to guide a user of the mobile device to hold the mobile device in the direction of a selected wireless enabled device.

12. The mobile device as claimed in claim 1, further comprising an orientation sensor that detects the orientation of the handheld mobile device.

13. The mobile device as claimed in claim 1, wherein said wireless interface is configured to transmit probing signals and receive response signals from wireless enabled devices to identify said wireless enabled devices, the capabilities of devices including a wireless enabled device and/or one or more parameters of said wireless enabled devices.

14. The mobile device as claimed in claim 1, wherein said wireless interface is configured to receive a beacon signal transmitted by a wireless device, said beacon signal including one or more parameters of a detected wireless enabled device.

15. The mobile device as claimed in claim 1, wherein said processor is configured to detect an optical information signal transmitted by a wireless enabled device, said optical information signal indicating that the wireless enabled device has a wireless link functionality and/or including one or more parameters of a detected wireless enabled device.

16. The mobile device as claimed in claim 1, wherein said processor is configured to detect an optical information signal transmitted by a light source, in particular an LED or an IP diode, or a predetermined display image displayed on a screen of a wireless enabled device.

17. The mobile device as claimed in claim 1, wherein said display is configured to display one or more parameters of a detected wireless enabled device.

18. The mobile device as claimed in claim 1, wherein said mobile device is configured to retrieve one or more parameters of a detected wireless enabled device from one or more database storing parameters of wireless enabled devices.

19. The mobile device as claimed in claim 1, wherein said wireless interface is configured to establish a wireless link to one or more databases storing parameters of wireless enabled devices.

20. A method for establishing a wireless link between a mobile device and a wireless enabled device, a wireless enabled device being a device that is configured to establish a wireless link with other devices, said method comprising: acquiring images of the surrounding of the mobile device, displaying images acquired by the mobile device, detecting wireless enabled devices within images acquired by the mobile device by applying an image recognition algorithm to detect wireless enabled devices within said images acquired by said mobile device, indicating detected wireless enabled devices in images displayed by the mobile device by an indicator, enabling a user to select an indicated wireless device, establishing a wireless link to a selected wireless enabled device and maintaining the wireless link in an active state to the selected wireless enabled device only when the selected wireless enabled device is shown in one of the currently acquired images.

* * * * *